Oct. 4, 1955 G. L. DUFIELD 2,719,963

CODE STORAGE APPARATUS

Filed Nov. 27, 1951 2 Sheets-Sheet 1

INVENTOR:
GARTH L. DUFIELD
BY Francis W. Crotty
HIS ATTORNEY.

Oct. 4, 1955 G. L. DUFIELD 2,719,963

CODE STORAGE APPARATUS

Filed Nov. 27, 1951 2 Sheets-Sheet 2

*INVENTOR:*

GARTH L. DUFIELD

*BY* Francis W. Crotty

HIS ATTORNEY.

United States Patent Office 2,719,963

Patented Oct. 4, 1955

2,719,963

CODE STORAGE APPARATUS

Garth L. Dufield, Elgin, Ill., assignor to Zenith Radio Corporation, a corporation of Illinois Application November 27, 1951, Serial No. 258,451

7 Claims. (Cl. 340—174)

Figure 1:
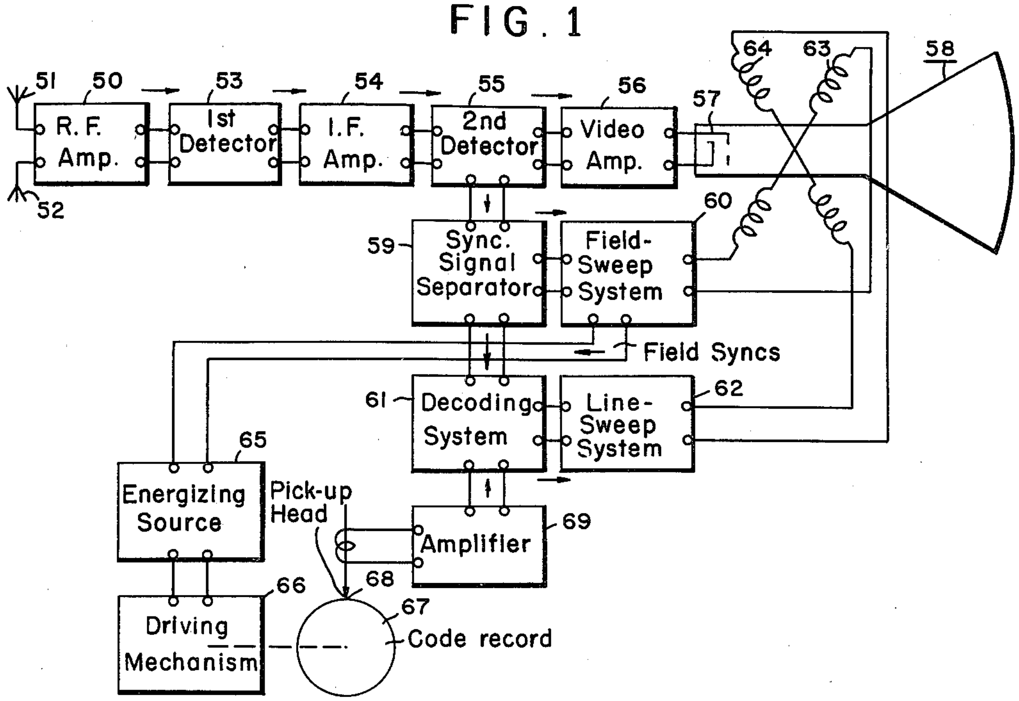

This invention relates to subscription television systems in which a television signal, coded in accordance with a selected code schedule, is distributed to subscriber receivers. More particularly, the invention is directed to improved storage apparatus in which such a code schedule may be recorded for use at the various subscriber receivers in decoding and utilizing the subscription telecast.

In subscription television systems it is usual for the transmitter to include suitable coding apparatus for causing a variation in some characteristic of the television signal so that it may be effectively coded. The coding apparatus may be actuated by a coding signal derived from a storage device having a selected code schedule recorded thereon to be scanned or read repeatedly to develop the coding signal. The storage device may take the form of a magnetic disc, tape or cylinder bearing the code information, or may comprise a code card or other well-known device. Each subscriber receiver is equipped with decoding apparatus responsive to a decoding signal to decipher the coded telecast and permit the receiver to reproduce the televised information. The decoding signal may be derived from a storage device similar to that used at the transmitter and having an identical code schedule recorded thereon. It is usual in this type of subscription system to change the coding schedule at the transmitter from time to time and, accordingly, each subscriber must periodically obtain a new code record to continue to utilize the subscription programs. Charges are made to the subscriber on the basis of code records purchased. That is, should the code schedule at the transmitter be changed weekly, subscribers purchase a new code record each week to receive the programs scheduled for that week.

An inherent disadvantage of such systems is the possibility of unauthorized duplication of the code records. Obviously, both the subscribers and the sponsors of the subscription service are entitled to protection against misappropriation of the subscription telecasts on the part of non-subscribers to the service. A primary purpose of the present invention is to provide code storage apparatus for use in subscription systems of the aforesaid type but which are constructed so that the recorded coding schedule is obliterated whenever any attempt is made to tamper with the apparatus or put it to an unauthorized use.

It is, accordingly, an object of this invention to provide storage apparatus for a subscription television system in which the coding schedule may be stored and constructed so that the stored schedule is destroyed with any attempt to put the apparatus to an unauthorized use.

The code storage apparatus of the invention comprises essentially a code record representing the aforesaid coding schedule. A wiper device is provided which in its operating condition destroys or obliterates the coding schedule represented by the record; and a trigger mechanism is coupled to the wiper for normally holding the wiper in an inoperative condition, but which releases the wiper whenever the storage apparatus is subjected to tampering.

Figure 2:
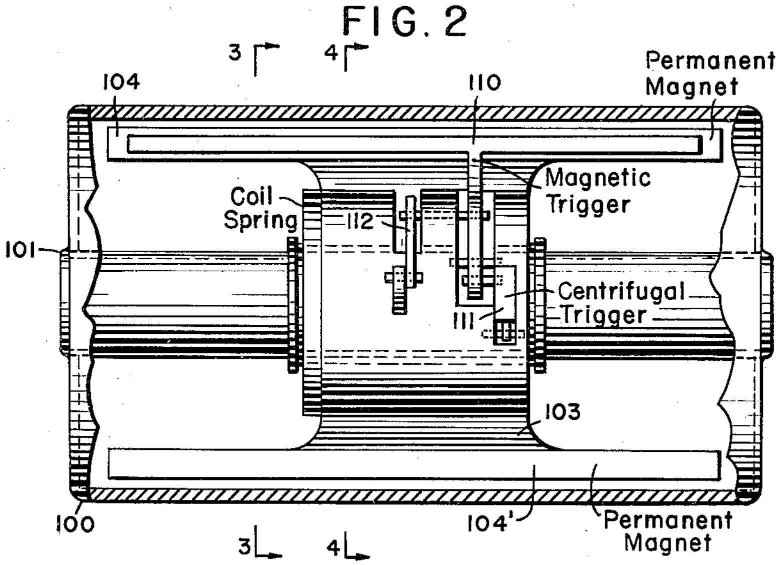
Figures 3, 4, 5, 6, 7:
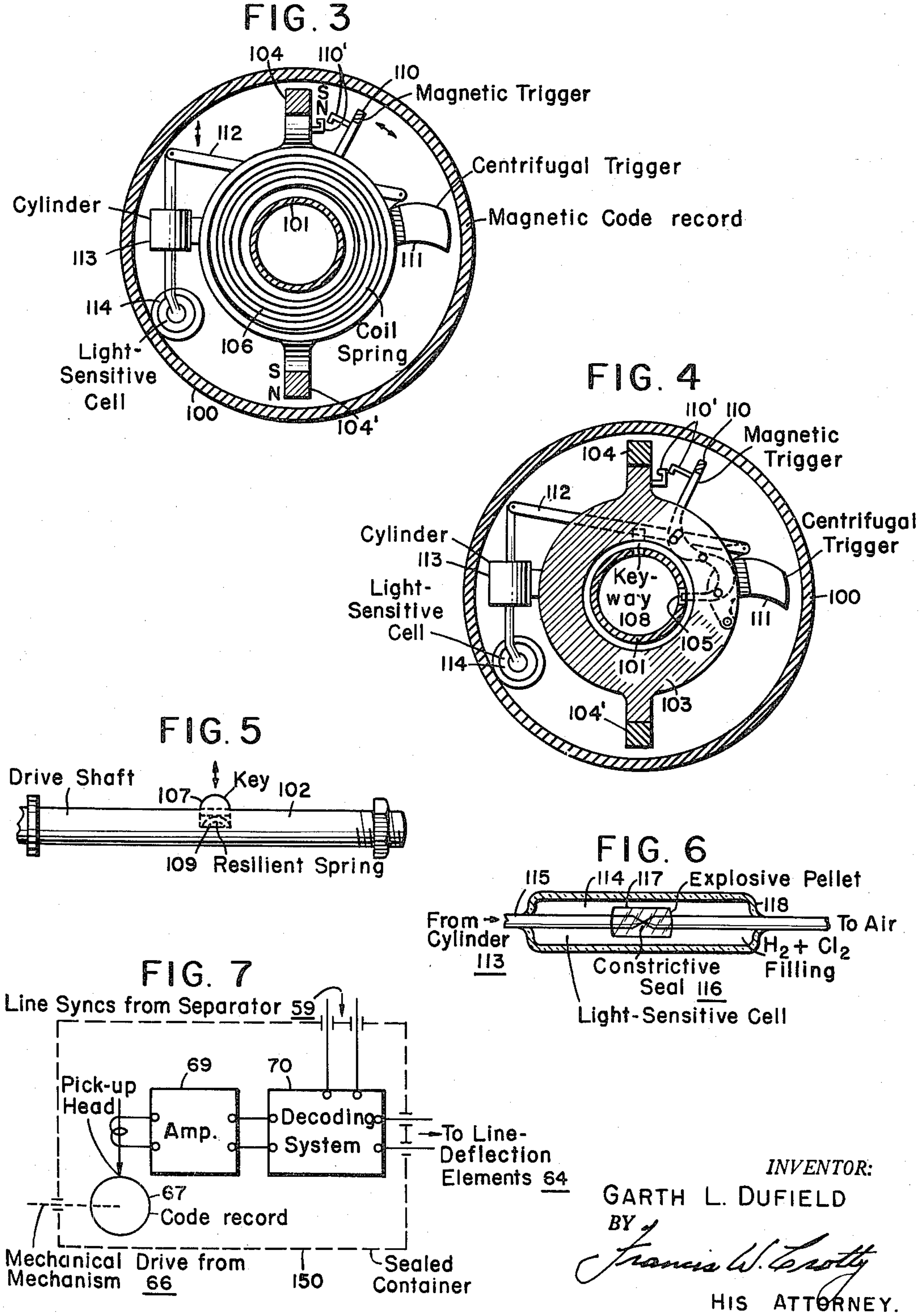

The features of this invention which are believed to be new are set forth with particularity in the appended claims. The invention itself, however, together with further objects and advantages thereof may best be understood by reference to the following description when taken in conjunction with the accompanying drawings, in which:

Figure 1 is a television receiver for utilizing a television signal from a subscription television transmitter, and into which the storage device of the invention may be incorporated, Figures 2–6 are various views of one embodiment of a code storage device constructed in accordance with the invention, and, Figure 7 is a schematic representation of another embodiment of the invention.

The subscriber receiver of Figure 1 includes a radio-frequency amplifier 50 of one or more stages having input terminals connected to an appropriate antenna circuit 51, 52 and output terminals connected to a first detector 53. The first detector is connected to an intermediate-frequency amplifier 54 of any desired number of stages which, in turn, is coupled to a second detector 55. Second detector 55 is coupled through a video amplifier 56 of any desired number of stages to the input electrodes 57 of a cathode-ray image-reproducing device 58.

Second detector 55 is also connected to a synchronizing-signal separator 59 which, in turn, is directly connected to a field-sweep system 60 and through a decoding system 61 to a line-sweep system 62. The output terminals of sweep systems 60, 62 are connected respectively to the field-deflection elements 63 and line-deflection elements 64 associated with reproducing device 58. Field-synchronizing pulses are derived from the field-sweep system and applied to an energizing source 65 which, in turn, is connected to a driving mechanism 66. The driving mechanism drives a code record 67 which may be constructed in accordance with the invention and which is scanned by a pick-up head 68 coupled to an amplifier 69 which, in turn, is connected to decoding system 61.

The receiver of Figure 1 may be tuned to a subscription television signal radiated by a subscription transmitter and coded by an alteration in the relative timing of the video and line-synchronizing components, these alterations occurring at spaced intervals established in accordance with a selected coding schedule. This signal is intercepted by antenna 51, 52 and amplified in radio-frequency amplifier 50. The amplified signal is heterodyned to the selected intermediate frequency of the receiver in first detector 53, and the resulting intermediate-frequency signal is amplified in amplifier 54 and detected in second detector 55 to produce a composite video signal. The video signal is amplified in video amplifier 56 and applied to input electrodes 57 of reproducing device 58 to control the intensity of the cathode-ray beam therein in well-known fashion.

The synchronizing components of the composite video signal are separated out in synchronizing-signal separator 59, the field-synchronizing components being used to synchronize field-sweep system 60 and, hence, the field scansion of device 58. The line-synchronizing components from separator 59 are utilized to synchronize line-sweep system 62 and, therefore, the line scansion of device 58. The purpose of decoding system 61 is to impart a compensating alteration to the line-synchronizing pulses impressed on the line-sweep system during the intervals when the video components of the received television signal are altered relative to the line-synchronizing components. In this manner, a compensating change may be made in the timing of the line scansion of device 58 enabling the device to reproduce the televised information.

In order that the decoding system may be actuated at the proper times to decode the received signal, code record 67 is driven in synchronism with a code record at the transmitter and has a coding schedule recorded thereon identical to that used at the transmitter. The synchronous drive of code record 67 is achieved by synchronizing source 65 with the field-synchronizing components obtained from the field-sweep system so that record 67 rotates at the same speed as the transmitter code record which is preferably at some submultiple of the field-scanning frequency of the system. Initial phasing between code record 67 and the transmitter code record may be achieved by any known means, not shown. For example, the phasing arrangement disclosed in copending application Serial No. 75,988, now Patent No. 2,656,407, filed February 12, 1949, in the name of Roswell H. Herrick et al., entitled "Subscriber Signalling System" and assigned to the present assignee, may be used to advantage.

When code record 67 is driven, pick-up head 68 produces a decoding signal having similar characteristics to the coding signal used at the transmitter. The decoding signal is amplified in amplifier 69 and applied to decoding system 61 so that the decoding system is actuated in time coincidence with the coding system used at the transmitter to code the television signal.

Decoding system 61 is described in detail in Patent 2,547,598, issued April 3, 1951, in the name of Erwin M. Roschke, entitled, "Subscription, Image Transmission System and Apparatus" and assigned to the present assignee; reference may be made to that patent for complete information regarding the details of this unit. The remaining stages of the receiver in themselves are extremely well-known to the art and a detailed description thereof is believed to be unwarranted. It is evident that the particular code record 67 can be used at the receiver as long as the transmitter adheres to a selected coding schedule. However, any change in the coding schedule employed at the transmitter necessitates the use of a new and related code record at the subscriber receiver. As previously pointed out the present invention is directed to code storage apparatus suitable for use in the receiver of Figure 1 and which is so constructed that the code schedule is obliterated whenever an attempt is made to put the device to an unauthorized use.

The embodiment of the code storage apparatus shown in Figures 2–6 is in the form of an enclosed cylindrical tube 100 which is impervious to light and which has a selected code magnetically recorded on its outer peripheral surface. As shown in Figure 2, tube 100 is supported upon a central hollow shaft 101 for receiving the drive shaft 102 of Figure 5 which, in turn, is mechanically connected to driving mechanism 66 of Figure 1. A wiper or erasing mechanism 103 is rotatably mounted on shaft 101 within tube 100 and comprises a pair of permanent magnets 104, 104' mounted adjacent the internal surface of tube 100 and extending along its length. Magnets 104, 104' are magnetized in a transverse direction to present, for example, a north pole and a south pole respectively, to the inner surface of the tube. Any relative rotation between wiper mechanism 103 and shaft 101 causes the magnets to move over the inside surface of tube 100, demagnetizing the tube and obliterating the code schedule.

The code storage apparatus includes a coil spring 106 which, whenever wiper 103 is released, causes it to rotate relative to shaft 101 clearing the code schedule from the device. The wiper is held against such relative rotation by various triggers and other means to be described hereinafter. Drive shaft 102 has a key 107 resiliently mounted in a slot therein, and when tube 100 is mounted on this shaft the key engages a keyway 108 in wiper mechanism 103 through a corresponding keyway in hollow shaft 101. The key is held in engagement with the keyways by a resilient spring 109, and prevents relative rotation between wiper 103 and shaft 101.

A magnetic trigger 110 is included in the code storage device, being pivoted to wiper 103 and received by a pair of radially aligned slots 105 in the wiper and in shaft 101.

When the magnetic trigger is in the position illustrated in Figure 4, it prevents relative rotation of the wiper and shaft 101 regardless of whether key 107 engages keyway 108 or not. A centrifugal trigger 111 is also pivoted to wiper 103 and to magnetic trigger 110, and the centrifugal trigger is biased by a suitable resilient means, not shown, into the position shown in Figure 4 wherein it maintains the magnetic trigger in its locking position to prevent relative rotation between wiper 103 and shaft 101.

An arm 112 is pivoted to wiper 103 and extends through a transverse slot in the wiper across keyway 108 so that should the arm drop from its upper illustrated position to its lower position, key 107 is released. Arm 112 is also pivoted to magnetic trigger 110 so that when the arm drops to its lower position, the magnetic trigger is released and the wiper rotates. The arm 112 is held in its upper position by air pressure in a cylinder 113, the pressure being held in the cylinder by means of a light-sensitive detonator cell 114. Whenever the opaque end walls of tube 100 or any other portion thereof are tampered with, cell 114 is exposed to light and explodes, freeing the compressed air from cylinder 113 and allowing arm 112 to drop thus releasing key 107 and trigger 110. It is preferable that arm 112 have a resilient spring biasing it towards its lower position against the restraining effect of air cylinder 113 so that when the air pressure in cylinder 113 is released the arm is held firmly in its lower position.

Details of the light-sensitive detonator cell are shown in Figure 6. It comprises a tube 115 extending from cylinder 113 and exposed to the atmosphere. The tube normally has a constrictive seal 116 formed therein for maintaining the air pressure in cylinder 113. An explosive pellet 117 surrounds the constrictive seal and the arrangement is enclosed by a glass vessel 118 filled with hydrogen and chlorine. Upon exposure to light the hydrogen and chlorine combine, causing pellet 117 to explode. This breaks the constrictive seal 116 and allows the compressed air in cylinder 113 to escape.

Assume now that the subscriber follows the proper procedure, that is, he purchases the code storage device from the proper source and places it in an authorized receiver. Until the device is placed in the receiver, relative rotation of wiper 103 and shaft 101 is prevented due to the engagement of magnetic trigger 110 with slots 105. When the device is placed on shaft 102 in the receiver, key 107 engages keyway 108 and as long as this engagement is maintained wiper 103 remains fixed relative to shaft 101. It is preferable that key 107 have a peculiar shape or is serrated in a particular manner, and that keyway 108 have a corresponding shape, so that wiper 103 is maintained in its fixed position only when the storage device is placed on a shaft having the proper key 107. Now, when pick-up head 68 is brought into an operative position its magnetic properties attract magnetic trigger 110 causing it to move in an anticlockwise direction and to become locked due to a latch 110' in a position out of engagement with slots 105. Moreover, even though the magnetic trigger 110 is not actuated, rotation of tube 100 causes centrifugal trigger 111 to move in a clockwise direction and release trigger 110 from slots 105. In each instance the only element holding wiper 103 against rotation relative to shaft 101 is key 107.

Should an individual in an attempt to tamper with the device break the end walls of tube 100 or any other portion thereof, the resulting light reaching the interior causes the line-sensitive cell 114 to explode, releasing the air pressure in cylinder 113. Spring loaded arm 112 then moves to its lower position, releasing the magnetic trigger from slots 105, and is firmly maintained in this position. With the magnetic trigger released wiper 103 is free to be rotated by spring 106 to remove the recording of the coding schedule. Even if the code storage device is not tampered with, but is placed on the drive shaft of an unauthorized machine, for example, to obtain illicit recordings of the code schedule the code record will usually be destroyed. This is so since the drive shaft of such a machine will ordinarily not be equipped with a key corresponding to key 107 so that rotation of the cylinder on this shaft or rotation of a magnetic pick-up head relative to the cylinder will cause the triggers to release the wiper and obliterate the code schedule. As pointed out previously, even when the device is placed in a legitimate machine, the magnetic pick-up head locks trigger 110 in a released position. Therefore, upon removal of the device from the machine for any purpose whatever, the disengagement of key 107 causes the wiper to be actuated to wipe off the coding schedule.

The interior of light cell 114 can be coated with fluorescent powder if so desired so that any attempt to X-ray the device will produce light within vessel 114 and explode cell 116, producing the previously described reactions.

To prevent a subscriber, having a receiver similar to that shown in Figure 1, from duplicating the coding schedule by merely connecting a recording device to the leads extending from amplifier 69 to decoding system 61; the embodiment of the invention shown in Figure 7 may be used. In this latter embodiment, code record 67, amplifier 69 and decoding system 70 are all enclosed in a sealed box 150; it being contemplated that each time the code is changed the entire box 150 is replaced at the receiver.

Code record 67 may be similar to that disclosed in Figures 2–6 with the exception that the internal portion of the code record is exposed to view. This may be accomplished, for example, by removing a section of one or both of the end portions of cylinder 100. It is apparent that should anyone tamper with box 150 in any way in an attempt to derive the code schedule, the resulting light introduced into the box causes cell 114 to release the pressure in cylinder 113 causing arm 112 to drop. This would release key 107 and cause the wiper mechanism to be actuated and the code record on cylinder 100 to be obliterated.

The invention provides, therefore, a code storage device bearing a selected code schedule, the device being so constructed that the schedule is obliterated whenever the device is put to any purpose except that to which it is intended.

While a particular embodiment of the invention has been shown, modifications may be made, and it is intended in the appended claims to cover all such modifications as fall within the true spirit and scope of the invention.

I claim:

1. An encoding device for a subscription television system having record-scanning apparatus comprising: storage-means for recording information representing a coding schedule and subject to be scanned by said apparatus; an erasing device for deleting information recorded on said storage means; and means including a trigger mechanism for normally holding said erasing device in an inoperative position but responsive to a predetermined abnormal operating condition to release said erasing device and delete said information.

2. An encoding device for a subscription television system having record-scanning apparatus comprising: storage-means for recording information representing a coding schedule and subject to be scanned by said apparatus; an erasing device mounted in engaging relation with said storage means for deleting information recorded on said storage means; and means including a trigger mechanism for normally holding said erasing device in a fixed position relative to said storage means but responsive to a predetermined abnormal operating condition to release said erasing device and enable said erasing device to be swept over said storage means.

3. An encoding device for a subscription television system having record-scanning apparatus comprising: storage-means for recording information representing a coding schedule and subject to be scanned by said apparatus; an erasing device mounted in engaging relation with said storage means for deleting information recorded on said storage means; and a magnetic trigger mechanism for holding said erasing device in an inoperative position but responsive to an extraneous magnetic field to release said erasing device.

4. An encoding device for a subscription television system having record-scanning apparatus comprising: storage-means for recording information representing a coding schedule and subject to be scanned by said apparatus; an erasing device mounted in engaging relation with said storage means for deleting information recorded on said storage means; and means including a centrifugal trigger mechanism for normally holding said erasing device in an inoperative position but responsive to rotation of said storage means to release said erasing device.

5. An encoding device for a subscription television system having record-scanning apparatus comprising: a magnetic code record for recording information representing a coding schedule; a drive shaft for said code record enabling said record to be scanned by said apparatus; a permanent-magnetic erasing device mounted on said shaft in engaging relation magnetically with said code record for deleting information recorded on said code record; a releasable key in said shaft for maintaining said erasing device and said code record in a fixed relative position; and a trigger mechanism normally maintaining said erasing device in a fixed position relative to said code record and releasable upon authorized use of said code record, whereby said erasing device is released and said information deleted upon subsequent disengagement of said key.

6. An encoding device for a subscription television system having record-scanning apparatus comprising: a magnetic code record for recording information representing a coding schedule; a drive shaft for said code record enabling said record to be scanned by said apparatus; a permanent-magnetic erasing device mounted on said shaft in engaging relation magnetically with said code record for deleting information recorded on said code record; a releasable key in said shaft for maintaining said erasing device and said code record in a fixed relative position; a trigger mechanism normally maintaining said erasing device in a fixed position relative to said code record and releasable upon authorized use of said code record, whereby said erasing device is released and said information deleted upon subsequent disengagement of said key; and a second trigger mechanism for disengaging said key in response to light rays incident thereon.

7. An encoding device for a subscription television system having record-scanning apparatus comprising: a hollow cylindrical magnetic code record for recording information representing a coding schedule; a drive shaft mounted coaxially within said code record and affixed thereto; a permanent-magnetic wiping device rotatably mounted on said shaft in engaging relation magnetically with said code record; a resilient spring for imparting relative rotation between said wiping device and said shaft to cause said wiper to sweep the code record and delete the information recorded on said code record; and means including a trigger mechanism for normally holding said wiping device in a fixed position relative to said shaft but responsive to a predetermined abnormal operating condition to release said wiping device and enable said wiping device to be actuated by said resilient spring.

References Cited in the file of this patent

UNITED STATES PATENTS

| | | |
|---|---|---|
| 2,315,737 | Ross | Apr. 6, 1943 |
| 2,513,683 | Shaper et al. | July 4, 1950 |